(12) United States Patent
O-oka et al.

(10) Patent No.: US 9,091,338 B2
(45) Date of Patent: Jul. 28, 2015

(54) FREE-FORM SURFACE GEAR

(71) Applicant: O-OKA CORPORATION, Toyota-shi, Aichi (JP)

(72) Inventors: Mitsushige O-oka, Toyota (JP); Yoshiki Kawasaki, Toyota (JP); Mitsuhiko Shimomura, Toyota (JP)

(73) Assignee: O-OKA CORPORATION, Toyota-shi, Aichi (JP)

(*) Notice: Subject to any disclaimer, the term of this patent is extended or adjusted under 35 U.S.C. 154(b) by 240 days.

(21) Appl. No.: 13/705,470

(22) Filed: Dec. 5, 2012

(65) Prior Publication Data

US 2013/0091970 A1    Apr. 18, 2013

Related U.S. Application Data

(63) Continuation-in-part of application No. PCT/JP2010/007540, filed on Dec. 27, 2010.

(30) Foreign Application Priority Data

Jun. 21, 2010  (JP) ................................ 2010-140565

(51) Int. Cl.
  *F16H 55/08*  (2006.01)
  *F16H 55/10*  (2006.01)
  (Continued)

(52) U.S. Cl.
  CPC .................. *F16H 55/02* (2013.01); *B21J 5/025* (2013.01); *B21K 1/30* (2013.01); *B21K 1/305* (2013.01);
  (Continued)

(58) Field of Classification Search
  CPC ..... F16H 55/17; F16H 55/08; F16H 55/0886; F16H 2055/0893

USPC .................................... 74/457, 458, 460, 462
See application file for complete search history.

(56) References Cited

U.S. PATENT DOCUMENTS 3,631,736 A    1/1972  Saari
3,709,055 A *  1/1973  Grove .............................. 74/462
(Continued)

FOREIGN PATENT DOCUMENTS

EP    1249641 A2    10/2002
JP    52-054854       5/1977
(Continued)

OTHER PUBLICATIONS

International Search Report of PCT/JP2010/007540, mailing date of Feb. 1, 2011.
(Continued)

*Primary Examiner* — Justin Krause
(74) *Attorney, Agent, or Firm* — Westerman, Hattori, Daniels & Adrian, LLP

(57) ABSTRACT

A transmission gear has a tooth surface formed of a free-form surface instead of an involute surface and a root area formed of a free-form surface instead of a trochoid surface. With such a transmission gear, the fatigue strength against contact pressure can be increased by reducing the Hertzian stress in the area around the meshing point of the tooth surface. The tooth surface is formed of a free-form surface in which the smallest radius of curvature in an area around a mating pitch point is maximized, and the fatigue strength against bending can be increased by reducing the bending stress at a tooth root portion of the bottom land. In addition, the gear noise can be reduced. The bottom land is formed of a free-form surface in which the smallest radius of curvature in an area around a tooth root is maximized.

9 Claims, 13 Drawing Sheets

(51) Int. Cl.
  *F16H 55/00* (2006.01)
  *F16H 55/17* (2006.01)
  *F16H 55/02* (2006.01)
  *B21K 1/30* (2006.01)
  *B21J 5/02* (2006.01)

(52) U.S. Cl.
  CPC ............ *F16H 55/08* (2013.01); *F16H 55/0886* (2013.01); *F16H 55/17* (2013.01); *F16H 2055/0893* (2013.01); *Y10T 29/49469* (2015.01); *Y10T 74/19953* (2015.01); *Y10T 74/19972* (2015.01)

(56) References Cited

U.S. PATENT DOCUMENTS

| | | | | |
|---|---|---|---|---|
| 3,855,874 | A | * | 12/1974 | Honma et al. .................. 74/462 |
| 4,051,745 | A | | 10/1977 | Ishikawa |
| 7,407,373 | B2 | * | 8/2008 | Ogata et al. ................... 418/171 |
| 8,424,408 | B2 | * | 4/2013 | Zsolt et al. ..................... 74/457 |
| 2008/0236320 | A1 | | 10/2008 | Takumori |
| 2010/0132496 | A1 | | 6/2010 | Okamoto |

FOREIGN PATENT DOCUMENTS

| | | |
|---|---|---|
| JP | 53-016154 | 2/1978 |
| JP | 55-132459 A | 10/1980 |
| JP | 61-088071 A | 5/1986 |
| JP | 08-105513 A | 4/1996 |
| JP | 2004-360877 A | 12/2004 |
| JP | 2008-240793 A | 10/2008 |
| JP | 3155682 U | 11/2009 |
| WO | 98/45623 A1 | 10/1998 |

OTHER PUBLICATIONS

Kawasaki, Yoshiki, "Development of High Precision (DIN8Grade) Forged Helical Gear (for Automobile Manual Transmission)", Journal of Japan Society of Mechanical Engineers, vol. 111, No. 1079, P. 55, w/ partial English translation.

Extended European Search Report dated Oct. 8, 2014, issued in corresponding EP application No. 10853602.0 (4 pages).

* cited by examiner

FREE-FORM SURFACE GEAR

CROSS-REFERENCE TO RELATED APPLICATION

This application is a Continuation-in-Part of PCT Application PCT/JP2010/007540 filed on Dec. 27, 2010, which claims priority to Japanese Application No. 2010-140565 filed on Jun. 21, 2010.

FIELD OF THE APPLICATION

The present disclosure relates to transmission gears for use in automobiles, construction machines, industrial machines, etc., and to a tooth profile of a spur gear or a helical gear.

BACKGROUND

The following description sets forth the inventor's knowledge of related art and problems therein and should not be construed as an admission of knowledge in the prior art.

The gear terms used above will be described with reference to FIG. 12. FIG. 12 is an enlarged perspective view of a tooth profile. The name of each part of the tooth profile is defined as follows. That is, a helical tooth 1 includes a top land 11 (area between symbols A and A'), tooth surfaces 12 (area between symbols A and B) at the left and right sides of the top land 11, bottom lands 13 (area between symbols B and B'), tooth end faces 14, and a tooth root 16. Symbols A and A' indicate the points at which contact with the mating gear finishes, and these points are at the boundaries between the top land 11 and the tooth surfaces 12. Symbols B and B' indicate the points at which contact with the mating gear starts and which correspond to the tooth root 16, and these points are at the boundaries between the tooth surfaces 12 and the bottom lands 13. Each tooth surface has a mating pitch point P at a position between symbols A and B, and the diameter of a circle that connects the mating pitch points P of each tooth is referred to as a mating pitch circle diameter. The deepest point of each bottom land 13 in the area between symbols B and B' is indicated by symbol D, and the diameter of a circle that connects the points indicated by symbol D of each tooth is referred to as a bottom land diameter (R). The diameter of a circle that connects the points indicated by symbols B and B' at the tooth root of each tooth is referred to as a true involute form diameter (TIF). There is the term "standard pitch circle diameter", which is similar to PCD. This term means the product of the number of teeth and the transverse module of a gear, which is specific to the gear and is independent of the mating gear. In contrast, mating PCD is the diameter of a circle that connects points, each of which the center-to-center distance between mating gears is divided in a ratio inverse to the number-of-teeth ratio. The gears mesh with each other at the mating pitch points P on the mating pitch circle, and are rotated in a rolling motion without a sliding motion being caused. The contact pressure is at a maximum when the gears mesh with each other at the mating pitch points P, which leads to problems of flaking, such as pitting, and reduces the life of the gears. The minimum radius of curvature is the smallest radius of curvature among a plurality of surfaces in an area around each mating pitch point P. The area between symbol B at the tooth root and symbol D at the deepest point is referred to as an area around the tooth root.

Conventionally, gear teeth have been formed into desired profiles by a cutting process. First, gears having a cycloid surface which were used in the pendulum clock invented by Huygens and which caused small rotational angle errors were used in the field of transmission mechanisms. However, although such a cycloid gear had a small rotational angle error and was suitable for use in clocks, a cutting tool having a complex shape was required since the gear included complex surfaces. In addition, it took a long time to cut each tooth. As time went by and demand for mass production of power transmission gears grew with the industrial revolution, cycloid gears, which were not suitable for mass production, disappeared. Instead, a gear generating method using linear cutting edges, which is suitable for mass production, has been developed. With this method, gears having a tooth surface formed of an involute surface and a root area formed of a trochoid surface can be generated. A cross section of such a gear taken along a plane perpendicular to the gear axis is illustrated in FIG. 13. Most of the gears that are in practical use today are formed by this method. The tool used in this method is a simple, linear rack cutter, and therefore the tooth surface is limited to being an involute surface and the bottom land is limited to being a trochoid surface; it is not possible to form other types of surfaces. A method for producing a gear by the gear generating method using linear cutting edges according to the related art will now be discussed. With this method, the tooth thickness can be easily changed by adjusting the cutting depth of the cutter, and the tooth root strength can be controlled accordingly. In addition, the involute surface can be formed with the linear rack cutter, which can be easily manufactured. With the thus-obtained involute gears, backlash can be maintained at a constant level even when the center-to-center distance between the mating gears varies, and the impact of vibration and sound can be reduced. In addition, the gears can be meshed with each other irrespective of the specifications thereof if the gears have the same normal pitch. The gears having the involute surfaces are advantageous in that the gears can be shifted while in use and can be arranged to appropriately mesh with each other by slightly changing the center-to-center distance between the gears. However, when the gears having the involute surfaces mesh with each other, rotational motion of the gears includes rolling and sliding. Therefore, rotational angle errors occur during the rotational motion including sliding and noise is easily generated as a result of sliding between the involute surfaces. In addition, since the tooth surface is formed of an involute surface, Hertzian stress cannot be minimized at an area around the meshing point. Accordingly, fatigue strength against contact pressure is low.

Further, in the involute gears formed by the gear generating method using linear cutting edges, the bottom land is limited to being the trochoid surface. Therefore, there is a geometric limit to how much the radius of curvature in the area around the tooth root can be increased. In particular, transmission gears used in automobiles are required to have a high tooth root strength. Therefore, owing to stress concentration that occurs at the tooth root portion, it is difficult to satisfy the demand for reduction in size and weight of transmissions with the gears formed by the gear generating method using linear cutting edges. On the other hand, even with the recent progress in the numerical control (NC) processing technology, it has been difficult to manufacture a gear cutting tool for forming surfaces other than the involute surface or the trochoid surface. However, when gears are formed by forging, a die having a surface of any shape can be manufactured, owing to the progress in the NC processing technology. By performing forging using such a die, a free-form surface other than the involute surface or the trochoid surface, or a three-dimensional surface may be obtained. In gears used in clocks, the tooth surface and the bottom land are both formed of a cycloid surface. In gears used in pumps, the tooth surface and the bottom land are both formed of a trochoid surface.

With the recent progress in die manufacturing using the NC technology, the following proposals have been made in which the shapes of the tooth surface and the bottom land are designed to increase the gear strength. That is, for example, an involute gear has been proposed whose tooth strength is increased without degrading the rotation-transmitting function thereof. In this gear, the entire area of each tooth surface is divided into a band-shaped contact area, which includes a trajectory of a contact point between the tooth surface and the mating tooth surface and that extends along the trajectory, and a non-contact area that is positioned outside the contact area. The contact area is formed as an involute helicoid surface and functions as a tooth contact surface which comes into contact with a tooth surface of the mating gear. The non-contact area is formed into a shape such that the non-contact area does not come into contact with the tooth surface of the mating gear. The shape of the non-contact area is obtained by changing a basic shape of the tooth surface, which is the shape in the case where the entire area of the tooth surface is formed as an involute helicoid surface, in a direction such that the tooth strength of the involute gear directly or indirectly increases. For example, the tooth tip is recessed with respect to the basic shape of the tooth tip at both ends thereof in the face width direction, and the bottom land is formed so as to protrude with respect to the basic shape of the bottom land at both ends thereof in the face width direction (see Japanese Unexamined Patent Application Publication No. 2004-360877). As another example, the following proposal has been made with regard to the shape of the bottom land. That is, to provide a high strength gear having a high tooth root strength, according to a first aspect, an involute gear or the like includes a tooth root portion having a profile that is not based on the tooth profile generation theory. According to a second aspect, the bottom land is formed of a bottom land surface that is not based on the tooth profile generation theory and with which stress concentration can be reduced. According to a third aspect, the tooth profile is formed by performing a forging step and then performing steps including a cold pressing step and a sizing step. According to a fourth aspect, the tooth profile is asymmetrical in the left-right direction with respect to the center of the tooth profile or the center of the bottom land. According to a fifth aspect, the bottom land is shaped such that left and right sections thereof with respect to the center of the tooth profile or the center of the bottom land have different shapes. According to a sixth aspect, a continuous fiber flow (fiber structure) is formed in the tooth by the forging step, the cold pressing step, the sizing step, etc. (see Japanese Unexamined Patent Application Publication No. 8-105513).

The above described gears according to the related art have the following problems.

That is, with regard to the tooth surfaces of the involute gears, since the involute gears that mesh with each other rotate while the involute surfaces slide along each other, rotational angle errors occur. In addition, since the involute surfaces slide along each other, noise is easily generated and the involute surfaces are easily worn away. In addition, since the tooth surfaces are formed of the involute surfaces, the radius of curvature cannot be increased and the Hertzian stress is maximized in the area around the meshing point. Therefore, the fatigue strength against contact pressure is low. With regard to the bottom lands of the involute gears, since the bottom lands are formed of the trochoid surfaces, there is a geometric limit to how much the radius of curvature of the bottom lands can be increased. Therefore, stress concentration occurs at the tooth root portion and the fatigue strength against bending is low. For the above-described two reasons, it has been difficult to satisfy the demand for reduction in size and weight of transmissions with the involute gears formed by the gear generating method using linear cutting edges. In addition, it has also been difficult to reduce the gear noise.

SUMMARY OF THE DISCLOSURE

The present disclosure relates to transmission gears for use in automobiles, construction machines, industrial machines, etc., and to a tooth profile of a spur gear or a helical gear. In the case of a spur gear, a tooth surface thereof is formed of a single surface selected from a cycloid surface, a trochoid surface, an epitrochoid surface, a peritrochoid surface, a circular surface, and a limacon surface or a compound surface that is a combination of surfaces selected from the above-mentioned surfaces and an involute surface. In the case of a helical gear, a tooth surface thereof is formed of a single surface selected from a cycloid helicoid surface, a trochoid helicoid surface, a circular helicoid surface, a limacon helicoid surface, a three-dimensional coordinate surface, an epitrochoid helicoid surface, and a peritrochoid helicoid surface or a compound surface that is a combination of surfaces selected from the above-mentioned surfaces and an involute helicoid surface. A bottom land, which is a surface below TIF (described below) of the tooth surface, includes a single surface selected from a cycloid surface, a trochoid surface, an epitrochoid surface, a peritrochoid surface, a circular helicoids surface, and a limacon surface. The single or compound surfaces that form the tooth surface or the bottom land are generically referred to as "free-form surfaces" in the following description. The present disclosure relates to a transmission gear having a free-form surface formed by hot forging or cold forging such that the smallest radius of curvature of a tooth surface in an area around a mating pitch point is maximized from a geometric aspect of the free form surface of the tooth surface to increase fatigue strength against bearing pressure and such that the smallest radius of curvature in an area around a tooth root is maximized from a geometric aspect of the free form surface of the tooth bottom land to increase fatigue strength against bending.

The present disclosure has been made in view of the above-described problems, and the inventors have arrived at the idea of manufacturing a forging die having a free-form surface by using the latest NC processing technology. An object of the present disclosure is to provide a transmission gear which has a tooth surface formed of a free-form surface instead of an involute surface and a root area formed of a free-form surface instead of a trochoid surface by a forging process, which is highly productive, using a forging die. With such a transmission gear, the fatigue strength against contact pressure can be increased by reducing the Hertzian stress in the area around the meshing point of the tooth surface, and the fatigue strength against bending can be increased by reducing the bending stress at a tooth root portion of the bottom land. In addition, the gear noise can be reduced.

In recent years, owing to the progress in the NC processing technology, it has become possible to manufacture a die having a surface of any shape. Accordingly, a gear having a free-form surface can be formed by using such a die in a forging process. The inventors of the present disclosure have used the trial-and-error approach to maximize the smallest radius of curvature of the tooth surface in the area around the mating pitch circle or the smallest radius of curvature of the bottom land, and have achieved a gear having optimum contact pressure strength and bending strength at each part of the tooth profile. A transmission gear according to the present disclosure is based on the above-described findings. According to an aspect of the present disclosure, a transmission gear includes a tooth surface formed of a free-form surface in which the smallest radius of curvature in an area around a mating pitch point is maximized from a geometric aspect of the free form surface of the tooth surface; and a bottom land formed of a free-form surface in which the smallest radius of curvature in an area around a tooth root is maximized from a geometric aspect of the free form surface of the tooth bottom land. In the transmission gear, the tooth surface may form a spur gear or a helical gear. In addition, in the transmission gear, the tooth surface may be formed of a single surface selected from a cycloid helicoid surface, a trochoid helicoid surface, a circular helicoid surface, a limacon helicoid surface, a three-dimensional coordinate surface, an epitrochoid helicoid surface, and a peritrochoid helicoid surface, or be formed of a compound surface of three type of surfaces selected from the cycloid helicoid surface, the trochoid helicoid surface, the circular helicoid surface, the limacon helicoid surface, the three-dimensional coordinate surface, the epitrochoid helicoid surface, the peritrochoid helicoid surface, and an involute helicoid surface. In addition, in the transmission gear, the tooth surface may be formed of a single surface selected from a cycloid surface, a trochoid surface, an epitrochoid surface, a peritrochoid surface, a circular surface, and a limacon surface, or be formed of a compound surface of three type of surfaces selected from the cycloid surface, the trochoid surface, the epitrochoid surface, the peritrochoid surface, the circular surface, the limacon surface, and an involute surface. In addition, in the transmission gear, the tooth surface may be formed of a single surface selected from a cycloid helicoid surface, a trochoid helicoid surface, an arced helicoid surface, a limacon helicoid surface, a three-dimensional coordinate surface, an epitrochoid helicoid surface, and a peritrochoid helicoid surface, and be formed of a helicoid surface subjected to a bias modification. In addition, in the transmission gear, the tooth surface may be formed of a single surface selected from a cycloid helicoid surface, a trochoid helicoid surface, a circular helicoid surface, a limacon helicoid surface, a three-dimensional coordinate surface, an epitrochoid helicoid surface, and a peritrochoid helicoid surface, and be subjected to convex crowning or is tapered such that a thickness of a tooth toward an end of a tooth width. In addition, in the transmission gear, the tooth surface may be formed of a single surface selected from a cycloid helicoid surface, a trochoid helicoid surface, a circular helicoid surface, a limacon helicoid surface, a three-dimensional coordinate surface, an epitrochoid helicoid surface, and a peritrochoid helicoid surface, and be subjected to concave crowning. In addition, in the transmission gear, the bottom land may be formed of a circular surface. In addition, the transmission gear may be formed by hot and cold forging.

The tooth surface of the gear is formed of a single or compound free-form surface, so that the fatigue strength against contact pressure is increased by reducing the Hertzian stress at the tooth surface and the fatigue strength against bending is increased by reducing the stress concentration at the bottom land. In addition, since the tooth surface is formed of a single or compound free-form surface, the noise can be reduced and the smallest radius of curvature of the tooth surface in the area around the mating pitch point can be maximized from a geometric aspect of the free form surface of the tooth surface. As a result, pitting or flaking at the tooth surface can be reduced. In other words, the smallest radius of curvature of the tooth surface and the smallest radius of curvature of the bottom land can be maximized by appropriately selecting a free-form surface or combining free-form surfaces. As a result, the fatigue strength against contact pressure of the tooth surface and the fatigue strength against bending of the bottom land can be increased. With regard to productivity, hot forging and cold forging, which are performed to form the gear, are highly productive and suitable for mass production.

Referring to FIG. 14, the free form tooth surface between A and B of tooth surface 12 is formed of a numerous number of curved surfaces having different radiuses of curvatures R1-R10. The area between symbols C and C' is called an area around the mating pitch point P. The tooth bottom land 13 has a tooth root 16 connecting to the tooth surface 12.

According to one embodiment of the present invention, the smallest radius of curvature R3 around the mating pith point P among various radiuses of curvature of the free form R3-R8 of the free form tooth surface between c and c' is maximized from the geometric aspect of the free form tooth surface of the area around the mating pitch point P. Likewise, the smallest radius of curvature R12 around a tooth root 16 among various radiuses of curvature R11-R13 of the free form tooth bottom land surface between B and B' of the tooth bottom land 13 is also maximized from the geometric aspect of the free form tooth surface of the tooth bottom land 13. If the radius of curvature of the free form tooth surface of the tooth bottom land 13 is a constant value such that the free form tooth surface is formed of a circular surface, the constant value is maximized from a geometric aspect.

BRIEF DESCRIPTION OF THE DRAWINGS

The advantages of the invention will become apparent in the following description taken in conjunction with the drawings, wherein.

DESCRIPTION OF THE EMBODIMENTS

Embodiments of the present disclosure will be described with reference to the accompanying drawings.

While the present disclosure may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

First Embodiment

Figure 1:
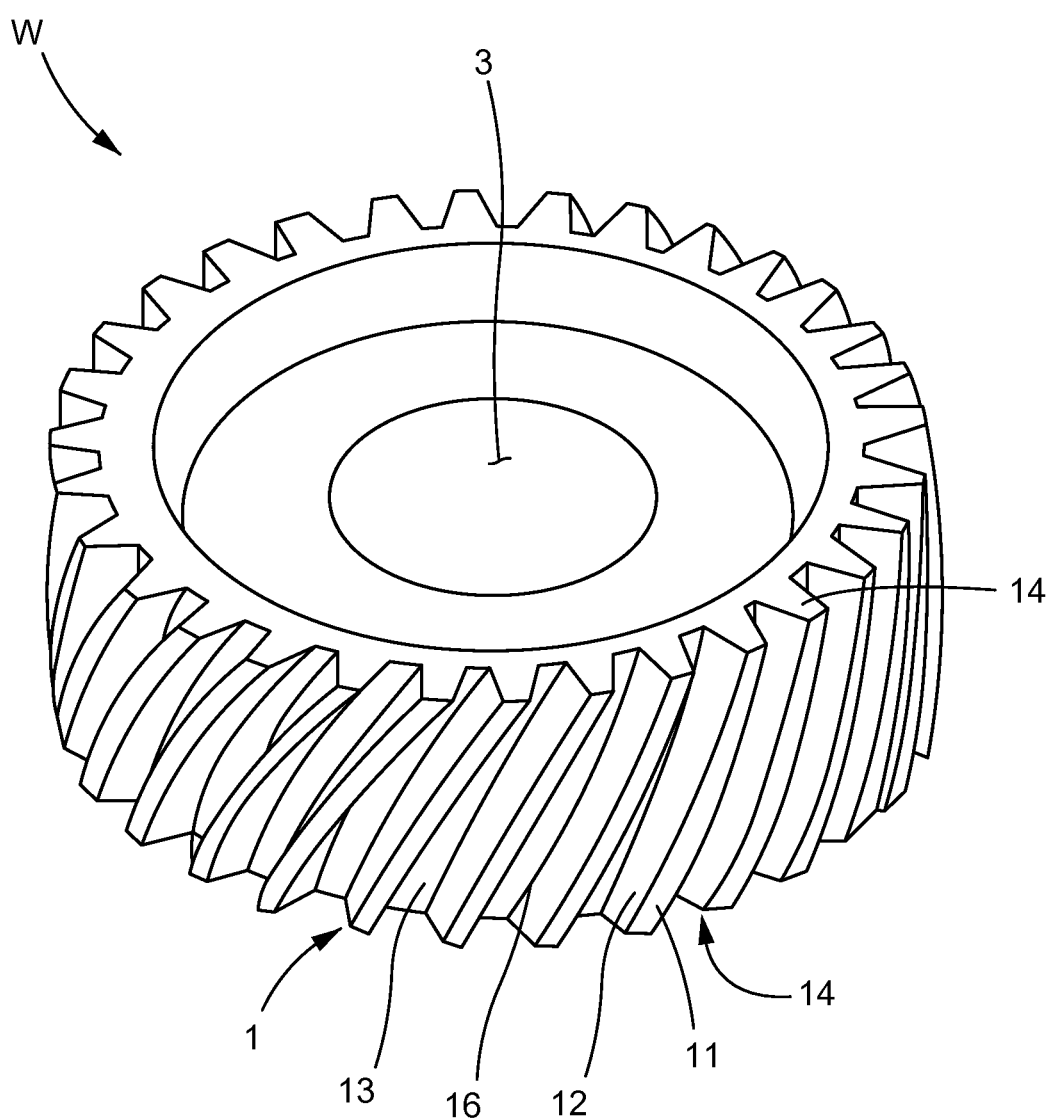
FIG. 1 is a perspective view illustrating a helical gear according to a first embodiment.
Figure 2:
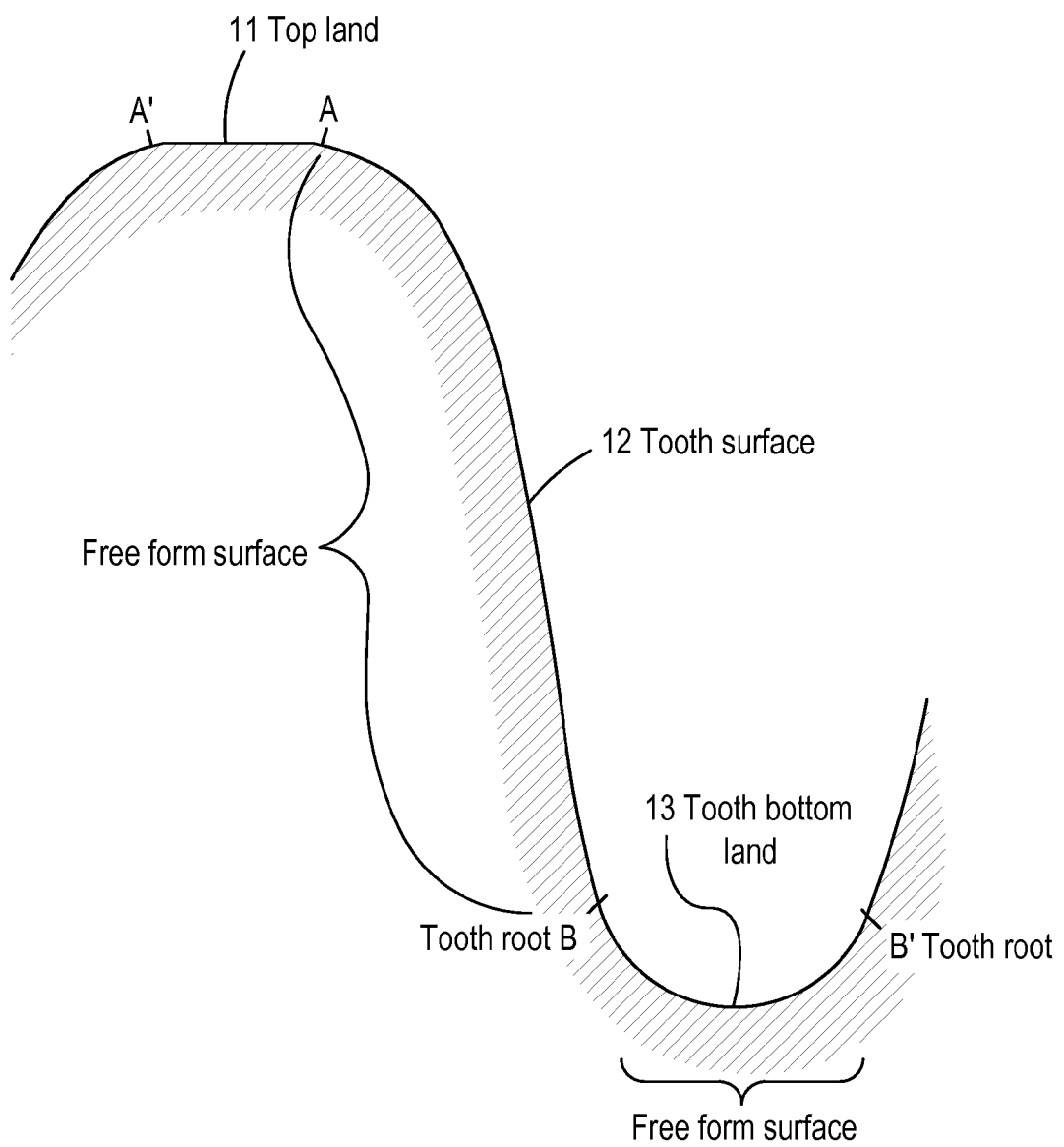
FIG. 2 is a sectional view of a tooth surface and a bottom land which are each formed of a single free-form surface according to the first embodiment.

The present embodiment is applied to a spur gear or a helical gear. The present embodiment will be described with reference to FIGS. 1 and 2. FIG. 1 is a perspective view of a transmission gear according to the present embodiment. FIG. 2 is a sectional view of a tooth profile formed of a single free-form surface.

The name of each part of the transmission gear according to the present embodiment illustrated in FIG. 1 will now be described. Each of helical teeth 1 at the outer periphery of the transmission gear W includes a top land 11 that extends in a tooth trace direction, tooth surfaces 12 at the left and right sides of the top land 11, bottom lands 13 on which the tooth surfaces 12 stand, tooth end faces 14 and 14 at the top and bottom ends in the tooth trace direction, and a tooth root 16. Here, the tooth profile of the helical teeth 1, whose tooth trace direction is helical with respect to a rotational axis direction of the gear, will be described.

Figure 12:
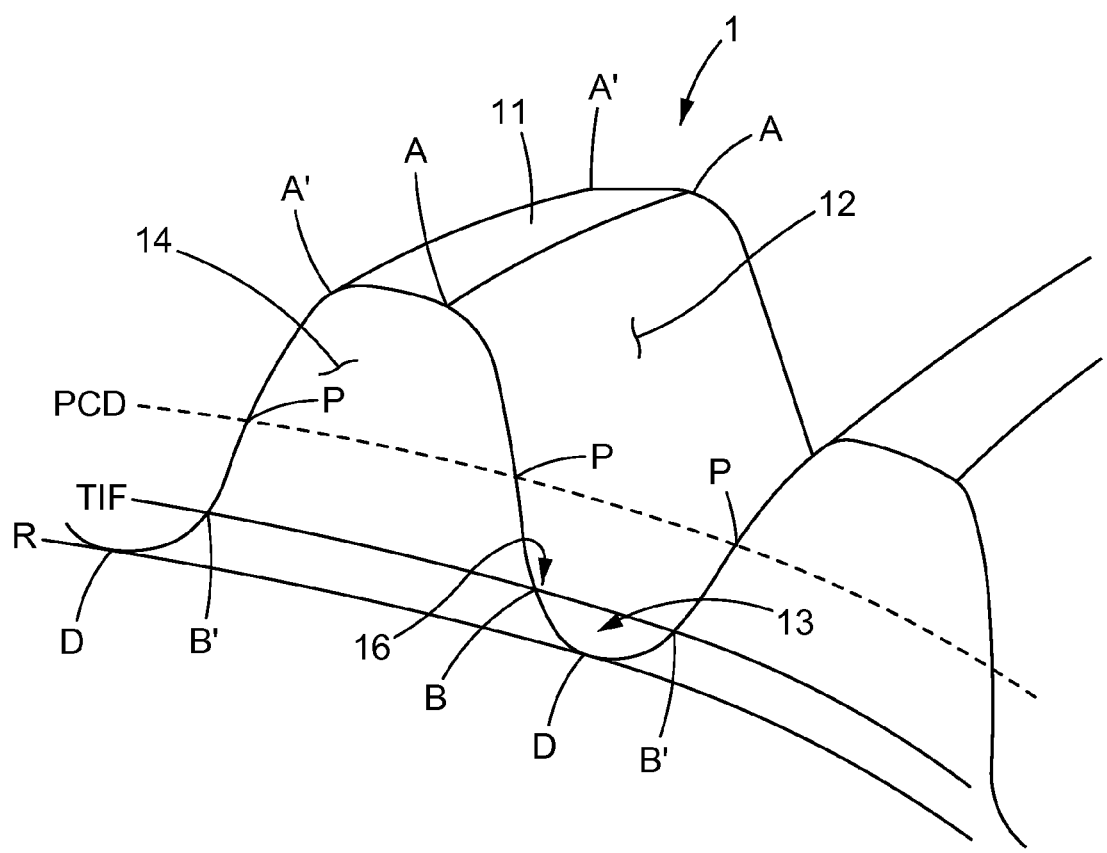
FIG. 12 is a diagram used to explain gear terms according to the related art.
Figure 13:
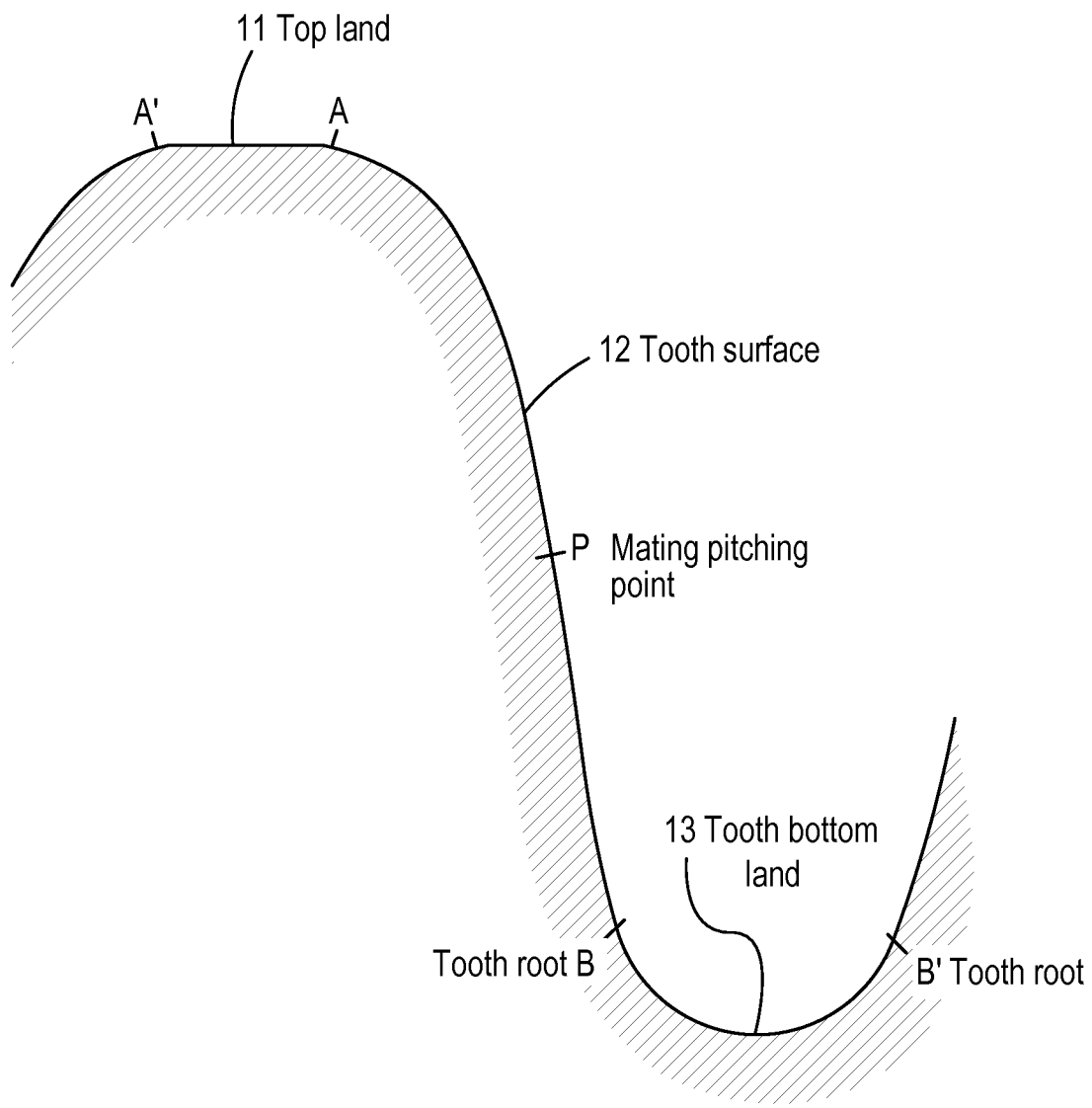
FIG. 13 is a sectional view illustrating a tooth profile according to the related art.
Figure 14:
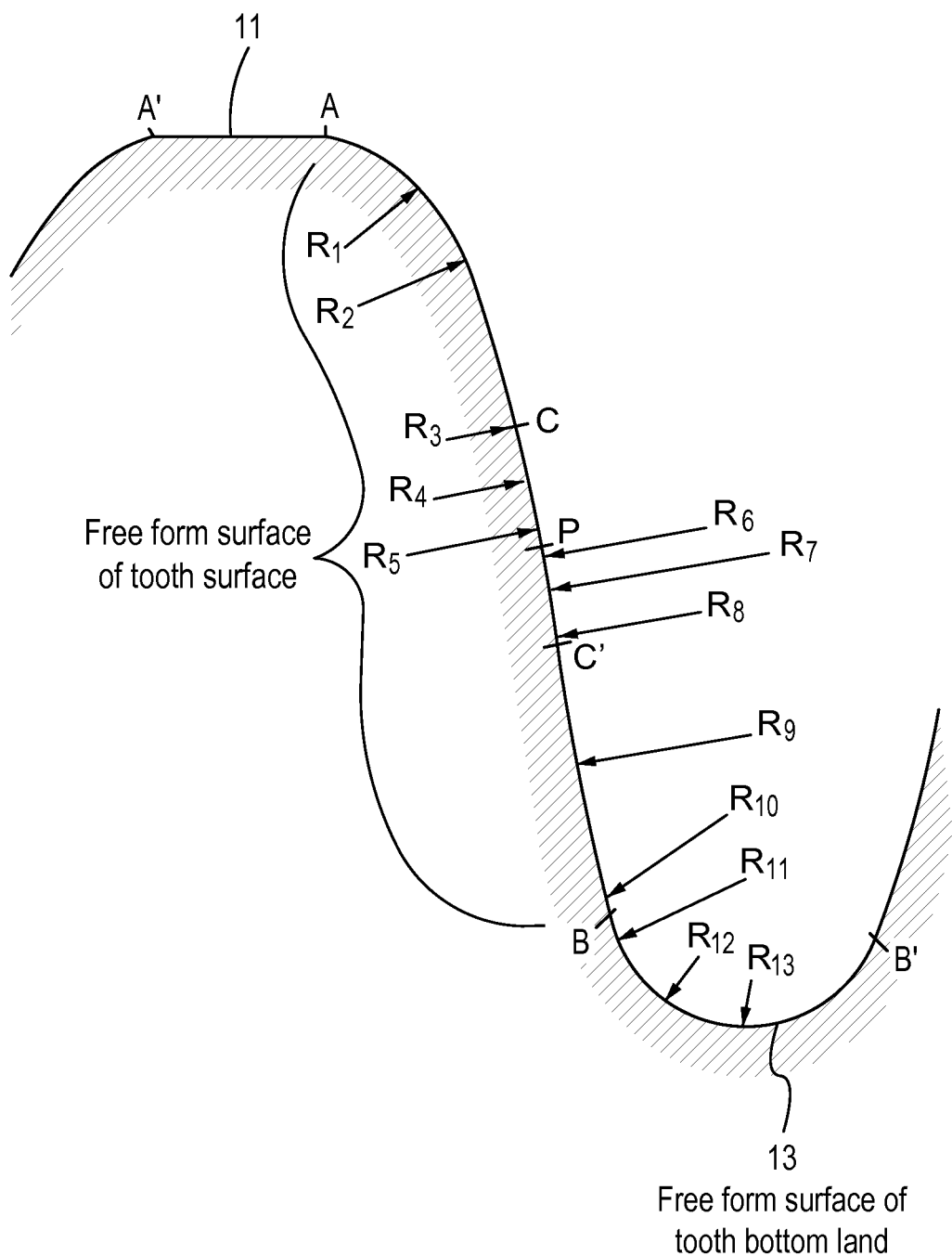
FIG. 14 is a sectional view illustrating a tooth profile having free form surfaces.

FIG. 2 is a normal cross section of the tooth profile of the helical teeth 1 at the outer periphery. The tooth surface and the bottom land are each formed with single free-form surface 1, and the overall tooth profile is formed of a compound free-form surface. The names of the parts of the gear illustrated in FIG. 1 correspond to symbols in FIG. 2 as follows. That is, the area between symbols A and A' corresponds to the top land 11 that extends in the tooth trace direction, the area between symbols A and B corresponds to the tooth surfaces 12 at the left and right sides of the top land 11, and the area between symbols B and B' at the tooth root corresponds to the bottom lands 13. Symbols A and A' indicate the points at which contact with the mating gear ceases, and these points correspond to the boundaries between the top land 11 and the tooth surfaces 12. Symbols B and B' indicate the points at which contact with the mating gear starts and which correspond to the tooth root 16, and these points are at the boundaries between the tooth surfaces 12 and the bottom lands 13. The free-form surface 1 of the tooth profile is formed of a single cycloid helicoid surface in the area between symbols A and B and is formed of a single circular surface in the bottom land 13 between symbols B and B'. The cycloid helicoid surface and the circular helicoid surface have a common tangent line at the connecting point therebetween, so that the surfaces are continuously connected to each other without an inflection point. However, even if undercuts are formed such that the tooth thickness is reduced at the tooth root or the surface is formed in a discontinuous shape at the bottom land below the line of TIF (see FIG. 12) that connects symbols B and B' at the tooth root, maximization of the smallest radius of curvature from a geometric aspect is prioritized. The gear having the tooth profile formed of the above-mentioned surfaces in the cross section along a plane perpendicular to the axis has the following effects. That is, since the bottom land is formed of the circular surface and the radius of curvature thereof is maximized from a geometric aspect, stress concentration is reduced and the bending strength is increased. In addition, since the tooth surface is formed of the cycloid helicoid surface that generates rolling rotating motion, the tooth surface smoothly contacts the mating tooth. In addition, since the radius of curvature of the tooth surface is large and the Hertzian stress is reduced, the pitting resistance and the fatigue strength against contact pressure are increased in the area around the mating pitch point P. Accordingly, sinking, flaking, etc., do not easily occur at the tooth surface in the area around the mating pitch point P. Although the level of gear noise is similar to that of the gear having the involute helicoid surface according to the related art, there is no problem in practical use.

A tooth profile including a tooth surface formed of another free-form surface that differs from the tooth profile described in the previous paragraph will be described with reference to FIG. 2. A free-form surface 2 of this tooth profile is formed of a single trochoid helicoid surface in the area between symbols A and B and is formed of a single circular surface in the bottom land 13 between symbols B and B'. Alternatively, the tooth surface may be formed of a single surface selected from a circular helicoid surface, a limacon helicoid surface, and a three-dimensional coordinate surface. In the case of a spur gear, the tooth surface is formed of a single surface selected from a cycloid surface, a trochoid surface, an epitrochoid surface, a peritrochoid surface, a circular surface, and a limacon surface. The bottom land 13 is formed of a single circular surface, and this also applies to the following embodiments. The gear having the tooth profile formed of the above-mentioned surfaces in cross section has the following effects. That is, since the bottom land is formed of the circular surface and the radius of curvature thereof is maximized, stress concentration is reduced and the bending strength is increased. With regard to the tooth surface, the pitting resistance in the area around the mating pitch point P is similar to that in the gear having the involute helicoid surface according to the related art, and there is no problem in practical use. Similarly, the state of meshing with the mating tooth at the tooth surface is similar to that of the gear having the involute helicoid surface according to the related art, and there is no problem in practical use. Since the tooth surface is formed of the trochoid helicoid surface, the meshing smoothness is lower than that of the gear having the involute helicoid surface according to the related art.

Second Embodiment

Figure 3:
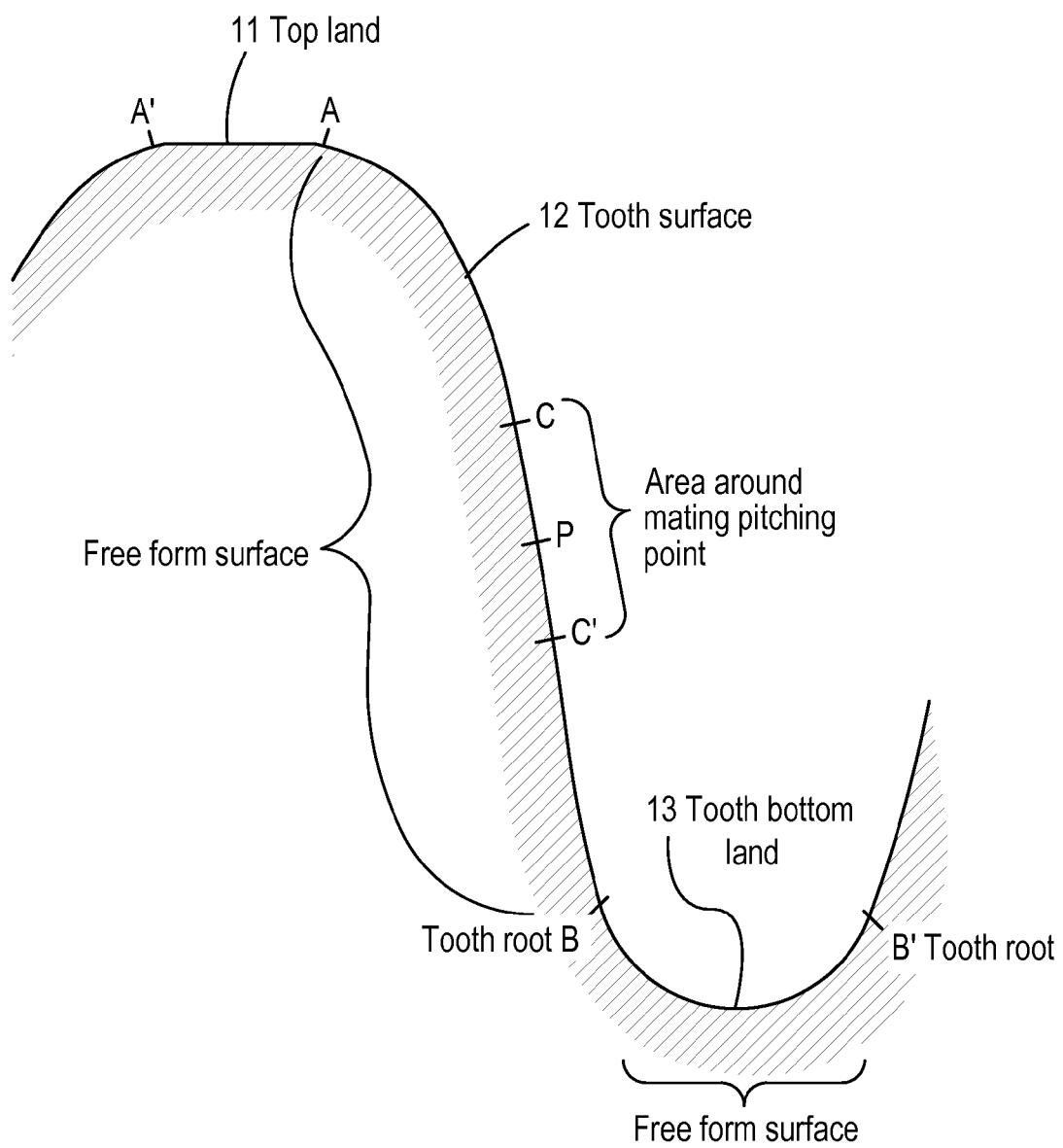
FIG. 3 is a sectional view of a tooth surface formed of a compound free-form surface and a bottom land according to a second embodiment.

The present embodiment is applied to a spur gear or a helical gear. Here, a spur gear will be described with reference to FIG. 3. The present embodiment differs from the first embodiment in that the tooth surface is formed of a compound free-form surface. The difference from the first embodiment will be mainly described below. A sectional view along a plane perpendicular to the axis that differs from FIG. 2 is shown in FIG. 3. The tooth surface is formed of a compound free-form surface, and the bottom land is formed of a single free-form surface. The overall tooth profile is formed of a compound free-form surface 3. In the free-form surface 3 of the tooth profile, the tooth surface is formed of a compound surface of three types of surfaces, which are an epitrochoid surface in the area between symbols A and C, a cycloid surface in the area between symbols C and C', and a trochoid surface in the area between symbols C' and B. The bottom land in the area between symbols B and B' is formed of a single circular surface. Here, the surface in the area between symbols A and C near the tooth tip is called an addendum surface, the area between symbols C and C' is called an area around the mating pitch point, and the surface in the area between symbols C' and B near the tooth root is called a dedendum surface. Since the tooth surface is curved, a length of point contact (LPC) is used to express the length of the tooth surface in terms of the length of a straight line. The LPC of the tooth surface in the area between symbols A and B is defined as L. The area around the mating pitch point is defined as the area in the range of 0.1 L on either side of the mating pitch point P. Each of the points indicated by symbols C and C' on both sides of the mating pitch point P is at a slant distance of 0.1 L from the mating pitch point P. The gear having the tooth profile formed of the above-mentioned surfaces in the cross section along a plane perpendicular to the axis has the following effects. That is, since the bottom land is formed of the circular surface and the radius of curvature thereof is maximized, the bending strength is considerably increased. The pitting resistance in the area around the mating pitch point P is similar to that in the gear having the involute surface according to the related art, and there is no problem in practical use. Similarly, the state of meshing with the mating tooth at the tooth surface is similar to that of the gear having the involute surface according to the related art, and there is no problem in practical use. Since the tooth surface is formed of the trochoid surface, the meshing smoothness is lower than that of the gear having the involute surface according to the related art.

A tooth profile including a tooth surface formed of another compound free-form surface that differs from the tooth profile described in the previous paragraph will be described with reference to FIG. 3. A free-form surface 4 of this tooth profile is formed of a trochoid surface in the area between symbols A and C, a cycloid surface in the area between symbols C and C', and an epitrochoid surface in the area between symbols C' and B. The bottom land in the area between symbols B and B' is formed of a single circular surface. The gear having the tooth profile formed of the above-mentioned surfaces in the cross section along a plane perpendicular to the axis has the following effects. That is, since the bottom land is formed of the circular surface and the radius of curvature thereof is maximized, the bending strength is considerably increased. In addition, since the tooth surface is formed of the cycloid surface that generates rolling rotating motion, the tooth surface smoothly contacts the mating tooth. In addition, since the radius of curvature of the tooth surface is large and the Hertzian stress is reduced, the pitting resistance is increased in the area around the mating pitch point P. Accordingly, sinking, flaking, etc., do not easily occur at the tooth surface in the area around the mating pitch point P. Although the level of gear noise is similar to that of the gear having the involute surface according to the related art, there is no problem in practical use.

A tooth profile including a tooth surface formed of another compound free-form surface that differs from the tooth profile described in the previous paragraph will be described with reference to FIG. 3. A free-form surface 5 of this tooth profile is formed of an involute surface in the area between symbols A and C, a cycloid surface in the area between symbols C and C', and a trochoid surface in the area between symbols C' and B. The bottom land in the area between symbols B and B' is formed of a single circular surface. The gear having the tooth profile formed of the above-mentioned surfaces in the cross section along a plane perpendicular to the axis has the following effects. That is, since the bottom land_is formed of the circular surface and the radius of curvature thereof is maximized, the bending strength is considerably increased. In addition, since the tooth surface is formed of the cycloid surface that generates rolling rotating motion, the tooth surface smoothly contacts the mating tooth. In addition, since the radius of curvature of the tooth surface is large and the Hertzian stress is reduced, the pitting resistance is increased in the area around the mating pitch point P. Accordingly, sinking, flaking, etc., do not easily occur at the tooth surface in the area around the mating pitch point P. In addition, since the tooth surface is formed of the involute surface in the area near the tooth tip, the gear noise can be reduced. The tooth surface may be formed of a compound surface of three types of surfaces selected from a cycloid surface, a trochoid surface, an epitrochoid surface, an involute surface, a peritrochoid surface, a circular surface, and a limacon surface. In the case of a helical gear, the tooth surface may be formed of a compound surface of three types of surfaces selected from a cycloid helicoid surface, a trochoid helicoid surface, an involute helicoid surface, a circular helicoid surface, a limacon helicoid surface, a three-dimensional coordinate surface, an epitrochoid helicoid surface, and a peritrochoid helicoid surface.

Characteristics of each of the tooth profiles have been described with reference to FIGS. 2 and 3, which illustrate the sectional views of the tooth profiles. From the viewpoint of practicability, the tooth profile illustrated in FIG. 3 in which the tooth surface is formed of a compound surface is more preferable than the tooth profile illustrated in FIG. 2 in which the tooth surface is formed of a single surface.

Third Embodiment

Figure 4:
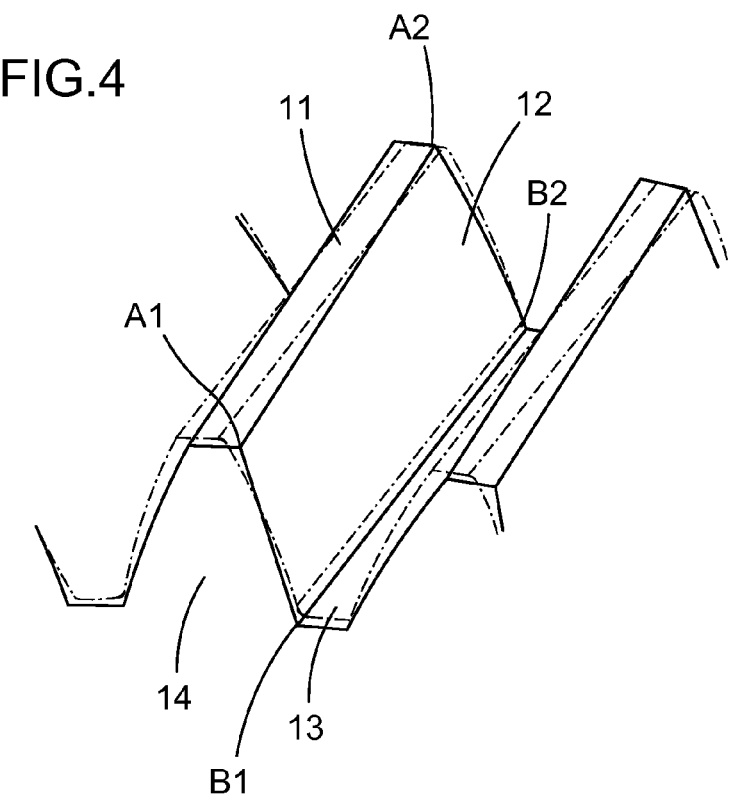
FIG. 4 is a perspective view of a tooth profile including a tooth surface formed of a biased-in free-form surface according to a third embodiment.
Figure 5:
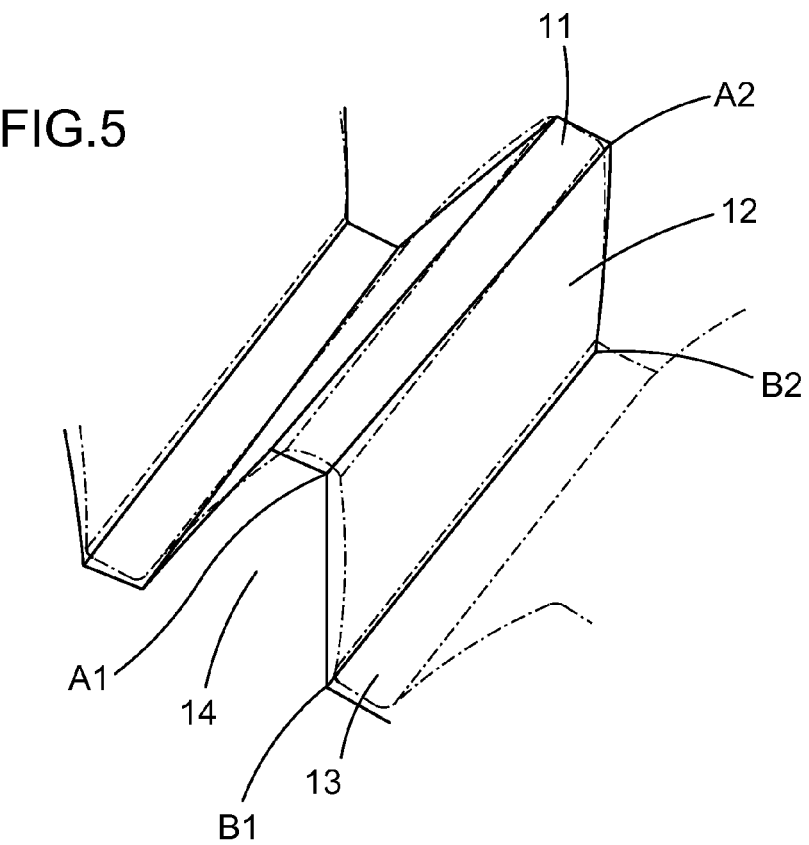
FIG. 5 is a perspective view of a tooth profile including a tooth surface formed of a biased-out free-form surfaces according to the third embodiment.

The present embodiment is applied to a helical gear. The helical gear includes a helicoid surface having a helix angle obtained by subjecting a tooth surface to a bias modification. The present embodiment will be described with reference to FIGS. 4 and 5. The present embodiment differs from the first and second embodiments in that the tooth surface is subjected to the bias modification. FIG. 4 is a perspective view of a tooth profile having a free-form surface obtained by subjecting the tooth surface to a bias-in modification. FIG. 5 is a perspective view of a tooth profile having a free-form surface obtained by subjecting the tooth surfaces to a bias-out modification.

Before describing the tooth profile, gear terms will be explained. There are two types of methods, which are the bias-in modification and the bias-out modification, for twisting the tooth surface. In the bias-in modification, the tooth surface of the gear is twisted such that the tooth surface is lowered at the tip on the obtuse-angle side and is raised at the tip on the acute-angle side. This type of modification is applied to low precision gears of levels 7 to according to the German Deutsches Institut fur Normung (DIN) standard. In the bias-out modification, the tooth surface of the gear is twisted such that the tooth surface is lowered at the tip on the acute-angle side and is raised at the tip on the obtuse-angle side. This type of modification is applied to high precision gears of levels of 4 to 6 according to the DIN standard.

FIG. 4 illustrates a tooth profile obtained by subjecting the helical teeth 1 at the outer periphery to the bias-in modification. The tooth profile includes a free-form surface 6 called a bias-in surface. The two-dot chain lines in FIG. 4 show a tooth profile before the bias modification. The solid lines show the bias-in surface according to the present embodiment, and the tooth surface surrounded by symbols A1, A2, B2, and B1 is the tooth surface of the bias-in gear obtained by subjecting the tooth profile before the modification shown by the two-dot chain lines to the bias modification. The bias modification is applied such that the tooth surface is lowered at the tip on the A1-side to form an obtuse angle and is raised at the tip on the A2-side to form an acute angle. In the free-form surface 6 of the tooth profile illustrated in FIG. 4, the tooth surface is formed of a single free-form surface. More specifically, the tooth surface surrounded by symbols A1, A2, B2, and B1 is a cycloid helicoid surface. The bias-in gear is characterized in that the gear noise generated at the tooth surface is considerably small. The free-form surface 6 called the bias-in surface has lower gear noise characteristics compared to those in the first and second embodiments of the present disclosure. Preferably, the tooth surface in the free-form surface 6 is formed of a cycloid helicoid surface. This is because when the gear meshes with the mating gear, the entire tooth surface performs a rolling rotating motion and no sliding occurs. Although the precision of the tooth surface of the bias-in gear is low, a practical tooth surface can be formed by hot forging or cold forging, which will be described below. The tooth surface may instead be a trochoid helicoid surface, a circular helicoid surface, a limacon helicoid surface, a three-dimensional coordinate surface used as a cam face, an epitrochoid helicoid surface, or a peritrochoid helicoid surface. This also applies to a bias-out tooth surface illustrated in FIG. 5.

FIG. 5 illustrates a tooth profile obtained by subjecting the helical teeth 1 at the outer periphery to the bias-out modification. The tooth profile includes a free-form surface 7 called a bias-out surface. The two-dot chain lines in FIG. 5 show a tooth profile before the bias modification. The solid lines show the bias-out surface according to the present embodiment, and the tooth surface surrounded by symbols A1, A2, B2, and B1 is the tooth surface of the bias-out gear obtained by subjecting the tooth profile before the modification shown by the two-dot chain lines to the bias modification. The bias modification is applied such that the tooth surface is lowered at the tip on the A1-side to form an obtuse angle and is raised at the tip on the A2-side to form an acute angle. In the free-form surface 7 of the tooth profile, the tooth surface is formed of a single free-form surface. More specifically, the tooth surface surrounded by symbols A1, A2, B2, and B1 is a cycloid helicoid surface. The bias-out tooth profile according to the present embodiment may be finished by polishing to increase the precision of the tooth profile. In the case where the tooth surface is polished to increase the precision of the tooth profile, the bias-out gear is characterized in that the gear noise generated at the tooth surface is considerably small.

The tooth profiles including free-form surfaces according to the third embodiment in which the tooth surfaces according to the first and second embodiments are subjected to the bias modification have been described. In the field of transmissions of automobiles to which the present disclosure is applied, there has long been a demand to reduce the gear noise. To satisfy this demand, the tooth surface of the first embodiment may be subjected to the bias modification. Accordingly, insufficient rigidity of a transmission casing can be compensated for, and an axial alignment error or a meshing variation between the mating gears can be absorbed. As a result, smoothness of rotation can be improved and the gear noise can be reduced. When selecting from the bias-in tooth profile and the bias-out tooth profile, the following factors are to be considered. That is, the bias-in tooth profile may be put to practical use in the case where the precision of the tooth surface is low, the contact ratio of the number of teeth that are constantly in mesh is low, and the rigidity of the transmission casing is low. The bias-out tooth profile may be applied in the case where the precision of the tooth surface is high, the contact ratio is high, and the rigidity of the transmission casing is high. As is understood from the above description, among the tooth profiles of the first, second, and third embodiments, the bias-in tooth profile according to the third embodiment is most ideal from the viewpoint of reducing the gear noise. A having the bias-in tooth profile can be mass-produced by hot forging or cold forging, which will be described below. Thus, a practical transmission gear can be realized. When a gear having the above-described tooth surface is used, load variation is reduced. Therefore, vibration applied to bearings that support the shaft of the gear is reduced, and the gear noise is reduced accordingly. In addition, since the load variation is reduced, the pitting resistance of the tooth surface and the bending strength of the area around the tooth root can be increased.

Fourth Embodiment

Figure 6:
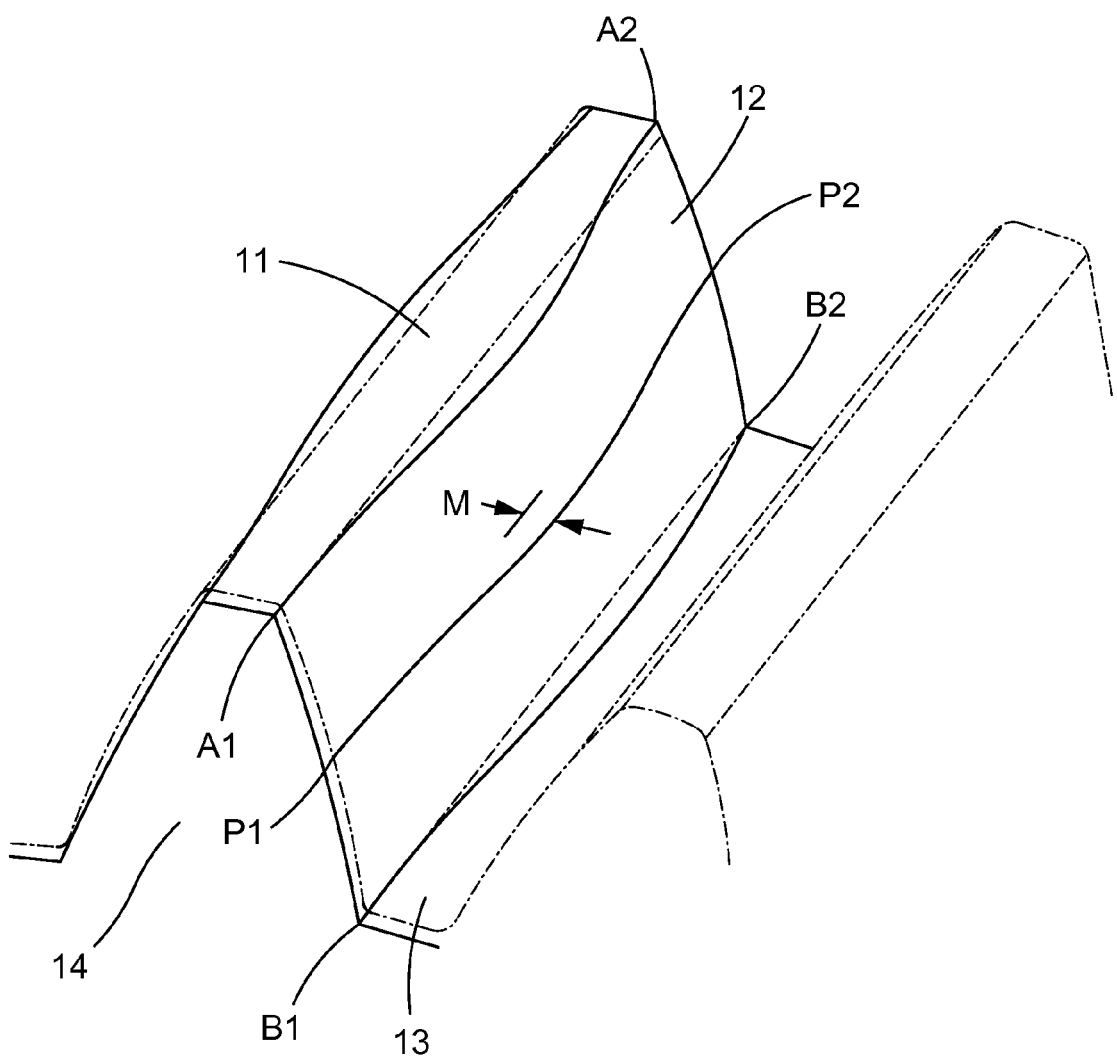
FIG. 6 is a perspective view of a convex-crowned tooth profile having a convex tooth surface according to a fourth embodiment.

The present embodiment is applied to a spur gear or a helical gear. The present embodiment will be described with reference to FIG. 6. The present embodiment differs from the first, second, and third embodiments in that the tooth surface is subjected to convex crowning. FIG. 6 is a perspective view of a convex-crowned tooth profile having a convex tooth surface.

FIG. 6 illustrates a tooth surface of a helical gear subjected to a convex crowning modification. The tooth surface is formed of a free-form surface 8. The two-dot chain lines in FIG. 6 show a tooth profile before the convex crowning modification. The solid lines show the convex-crowned tooth surface according to the present embodiment, which is the surface surrounded by symbols A1, A2, B2, and B1. The amount M by which the tooth surface bulges is, for example, in the range of 1 µm to 50 µm on a line that connects the mating pitch points P1 and P2 in FIG. 6. In the free-form surface 8 of the tooth profile, the tooth surface is formed of a single free-form surface. More specifically, the tooth surface surrounded by symbols A1, A2, B2, and B1 is formed of a cycloid helicoid surface. Alternatively, the tooth surface may be formed of a single surface selected from a trochoid helicoid surface, an arced helicoid surface, a limacon helicoid surface, a three-dimensional coordinate surface used as a cam face, an epitrochoid helicoid surface, and a peritrochoid helicoid surface. In the case of a spur gear, the tooth surface is formed of a single surface selected from a cycloid surface, a trochoid surface, an epitrochoid surface, a peritrochoid surface, a circular surface, and a limacon surface. Also in a spur gear or a helical gear according to a fifth embodiment, which will be described below, the tooth profile includes the above-mentioned surfaces. According to the free-form surface 8 in the convex-crowned tooth profile having the convex tooth surface, compared to the gear having the involute surface according to the related art, the pitting resistance in the area around the mating pitch point can be increased. More specifically, the Hertzian stress can be reduced by maximizing the radius of curvature at the mating pitch point P on the tooth surface, so that the pitting resistance can be increased. The free-form surface 8 has the circular surface at the bottom land, which surface is best for maximizing the smallest radius of curvature at the bottom land. Accordingly, the bending strength in the area around the tooth root can be increased. In addition, when convex-crowned gears mesh with each other, edge contact (hereinafter referred to as uneven contact) between the tooth surfaces does not occur. As a result, vibration is reduced and the gear noise is reduced accordingly. In addition, since variation in load applied to bearings that support the shaft of the gear can be reduced, the impact strength can be increased and resonance can be reduced in, for example, special-purpose vehicles such as racing vehicles. In four-wheel-drive vehicles or electric vehicles, a reduction gear ratio is high and large impact load is applied to the tooth surface. Therefore, it is desirable to prevent uneven contact. In such a case, the uneven contact can be corrected by using a gear having the free-form surface 8 subjected to convex crowning.

Fifth Embodiment

Figure 7:
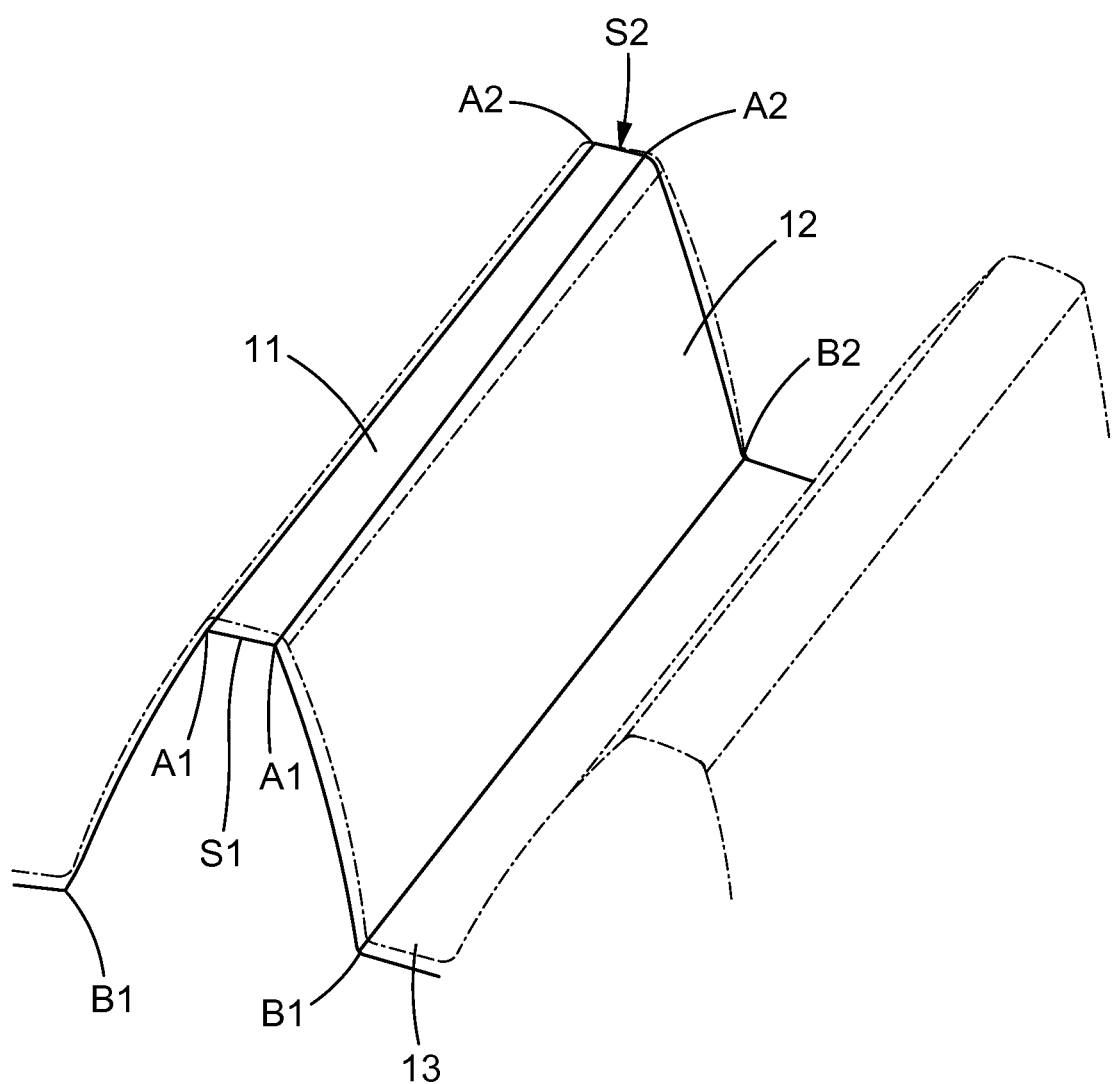
FIG. 7 is a perspective view of a tapered-lead tooth profile having a tapered top land according to a fifth embodiment.

The present embodiment is applied to a spur gear or a helical gear. The present embodiment will be described with reference to FIG. 7. The present embodiment differs from the fourth embodiment in that the top land is tapered. FIG. 7 is a perspective view of a tapered-lead tooth profile having a top land whose width decreases toward an and thereof.

FIG. 7 illustrates the tooth surface of a helical gear having a tapered top land. The tooth profile includes a free-form surface 9 called a tapered-lead tooth. Although tooth profiles are generally symmetrically tapered, the tooth profile according to the present embodiment may be tapered asymmetrically. The two-dot chain lines in FIG. 7 show a tooth profile that is not tapered. The solid lines show the tapered-lead tooth profile according to the present embodiment, and the tooth surface surrounded by symbols A1, A2, B2, and B1 is formed of a cycloid helicoid surface. The top land 11 is tapered such that the thickness thereof decreases from the front end toward the back end in the tooth trace direction, and the difference between the larger thickness S1 at the front end and the smaller thickness S2 at the back end is, for example, in the range of 1 μm to 0.5 mm. When the tapered-lead helical gear having the tapered tooth profile including the free-form surface 9 meshes with a straight helical gear, compared to the case in which the gears having the involute surfaces according to the related art mesh with each other, the occurrence of uneven contact due to insufficient casing rigidity can be reduced. In addition, the tooth contact position is shifted toward the center, so that the bending strength is increased.

Sixth Embodiment

Figure 8:
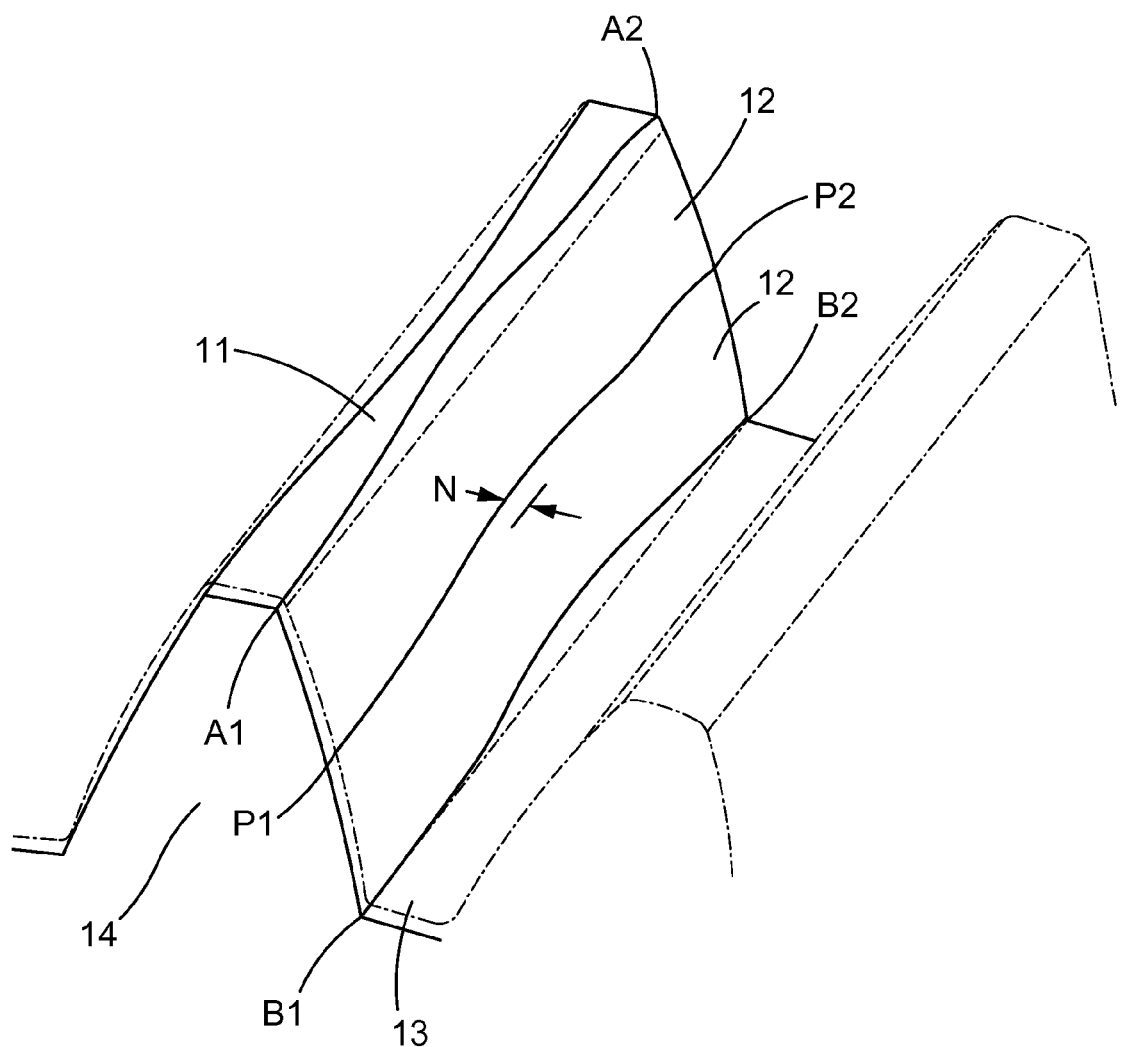
FIG. 8 is a perspective view of a concave-crowned tooth profile having a concave tooth surface according to a sixth embodiment.

The present embodiment is applied to a helical gear. The tooth surface is subjected to concave crowning, and includes a helicoid surface having a helix angle. The present embodiment will be described with reference to FIG. 8. The present embodiment differs from the fourth and fifth embodiments in that rotational axes of the mating gears are not parallel to each other but cross each other. FIG. 8 is a perspective view of a concave-crowned tooth profile having a concave tooth surface.

FIG. 8 illustrates the tooth surface subjected to concave crowning. The tooth profile includes a free-form surface 10 called a concave crowning tooth. The two-dot chain lines in FIG. 8 show a tooth profile before the concave crowning modification. The solid lines show the concave-crowned tooth surface according to the present embodiment, which is the surface surrounded by symbols A1, A2, B2, and B1. The amount N by which the surface is recessed is, for example, in the range of 1 μm to 0.5 mm on a line that connects the mating pitch points P1 and P2 in FIG. 8. In the free-form surface 10, the tooth surface is formed of a single free-form surface. Preferably, the tooth surface is formed of a cycloid helicoid surface. Alternatively, the tooth surface may instead be formed of a trochoid helicoid surface, a circular helicoid surface, a limacon helicoid surface, a three-dimensional coordinate surface used as a cam face, an epitrochoid helicoid surface, or a peritrochoid helicoid surface. When the concave-crowned gear according to the present embodiment meshes with a convex-crowned gear, compared to the case in which the gears having the involute surfaces according to the related art mesh with each other, the tooth contact area is increased. Accordingly, the transmission efficiency can be increased. In addition, variation in load applied when the gears mesh with each other can be reduced, so that loss in transmission force can be reduced.

The definitions of the free-form surfaces according to the first to seventh embodiments will now be described. The free-form surface 1 is formed of a cycloid helicoid surface and a circular helicoid surface illustrated in FIG. 2. The free-form surface 2 is formed of a trochoid helicoid surface and a circular surface illustrated in FIG. 2. The free-form surface 3 is formed of an epitrochoid surface, a cycloid surface, a trochoid surface, and a circular surface illustrated in FIG. 3. The free-form surface 4 is formed of a trochoid surface, a cycloid surface, an epitrochoid surface, and a circular surface illustrated in FIG. 3. The free-form surface 5 is formed of an involute surface, a cycloid surface, a trochoid surface, and a circular surface illustrated in FIG. 3. The free-form surface 6 is a surface of a bias-in gear, and is formed of a cycloid helicoid surface and a circular surface illustrated in FIG. 4. The free-form surface 7 is a surface of a bias-out gear, and is formed of a cycloid helicoid surface and a circular surface illustrated in FIG. 5. The free-form surface 8 is a surface of a convex-crowned gear, and is formed of a cycloid helicoid surface and a circular surface illustrated in FIG. 6. The free-form surface 9 is a surface of a tapered-lead gear, and is formed of a cycloid helicoid surface and a circular surface illustrated in FIG. 7. The free-form surface 10 is a surface of a concave-crowned gear, and is formed of a cycloid helicoid surface and a circular surface illustrated in FIG. 8.

Seventh Embodiment

Figure 9:
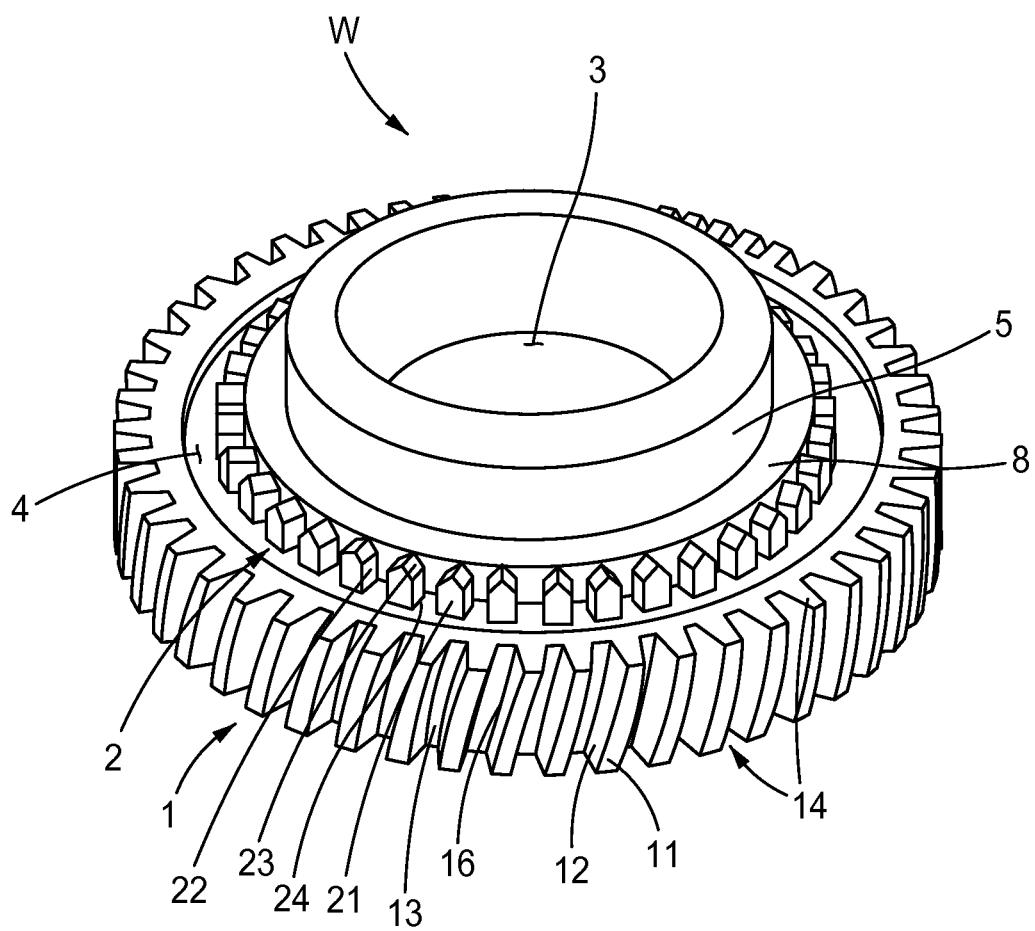
FIG. 9 is a perspective view of a transmission gear including helical teeth at the outer periphery and dog clutch teeth in the inner area according to a seventh embodiment.
Figure 10:
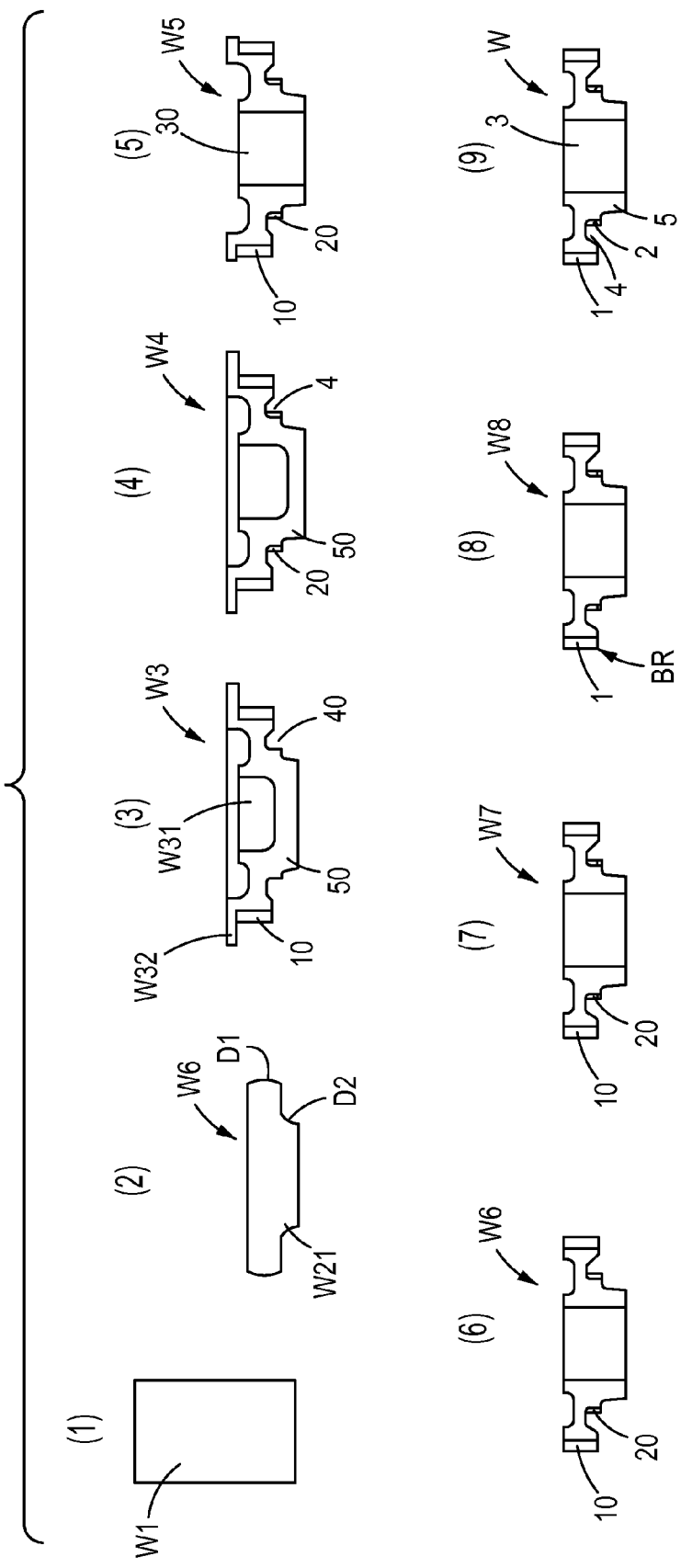
FIG. 10 is a process chart illustrating the process of producing the transmission gear according to the seventh embodiment.
Figure 11:
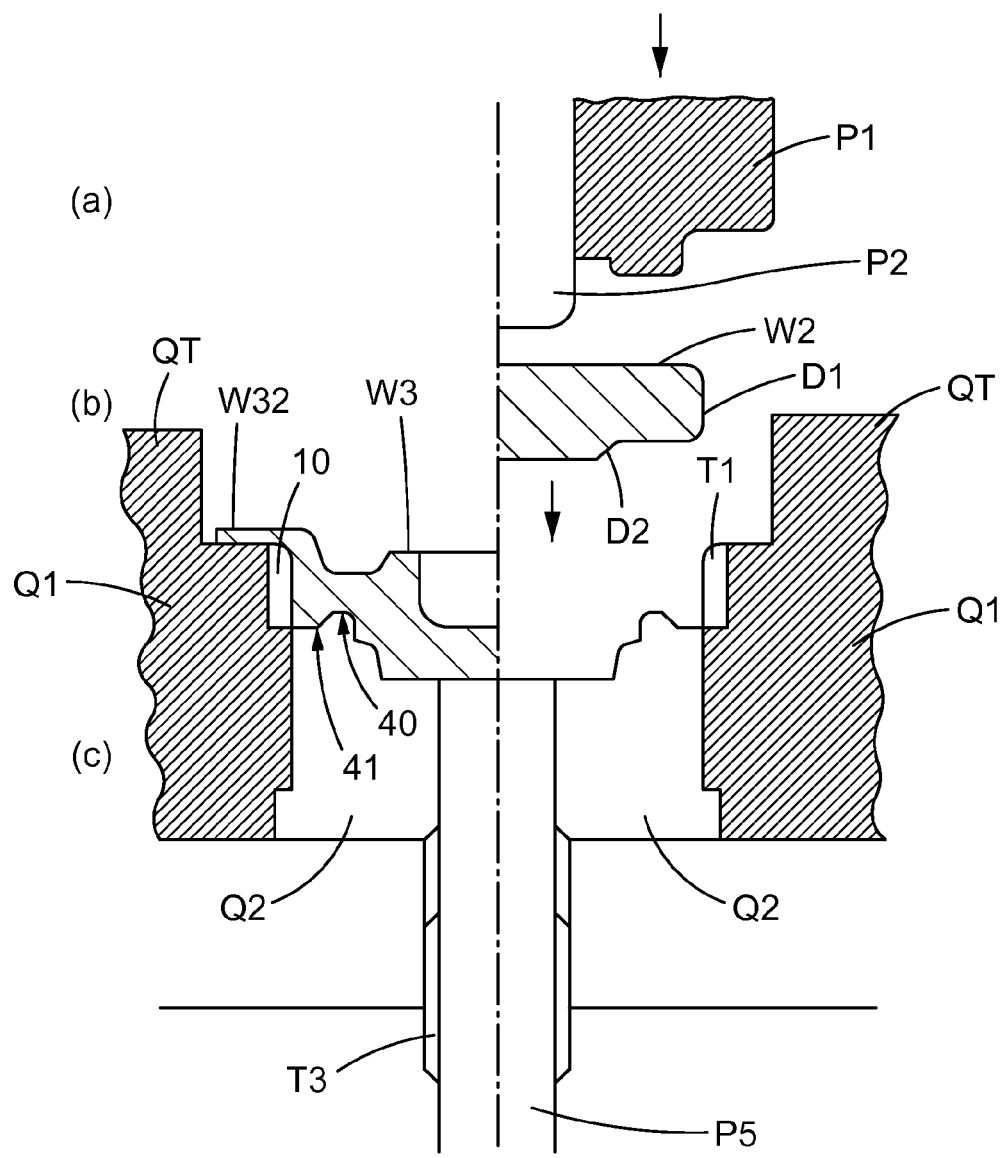
FIG. 11 is a schematic diagram illustrating the manner in which a tooth profile is formed by hot forging according to the seventh embodiment.

In the present embodiment, the tooth profiles including the free-form surfaces described in the first to sixth embodiments are applied to a transmission gear. The present embodiment will be described with reference to FIGS. 9 to 11. According to the present embodiment, hot forging is a semi-closed process and cold forging is a sizing process or a coining process. FIG. 9 is a perspective view of a sunk helical gear for a transmission including helical teeth at the outer periphery and dog clutch teeth in the inner area. FIG. 10 is a process chart illustrating the process of producing the sunk helical gear. FIG. 11 is a schematic diagram illustrating the manner in which a tooth profile is formed by hot forging. Here, the sunk helical gear is a gear that has been developed by the assignee of the present disclosure and in which the tooth roots of the dog clutch teeth in the inner area are sunk lower in the axial direction than the tooth end faces of the helical teeth at the outer periphery.

A forging process for producing a sunk helical gear having a free-form surface in the tooth profile will now be described. The detailed shape of the sunk helical gear according to the present embodiment is illustrated in FIG. 9. The tooth trace direction of the helical teeth 1 at the outer periphery is helical with respect to the axial direction. The dog clutch teeth 2 are formed in the area inside the helical teeth 1. The names of the parts of each helical tooth 1 and each dog clutch tooth 2 are defined as follows. That is, each helical tooth 1 includes a top land 11 that extends in the tooth trace direction, tooth surfaces 12 and at the left and right sides of the top land 11, bottom lands 13 on which the tooth surfaces 12 stand, tooth end faces 14 and 14 at the top and bottom ends in the tooth trace direction, and a tooth root 16. Each dog clutch tooth 2 includes a top land 21 that extends in the tooth trace direction, tooth surfaces 22 and 22 at the left and right sides of the top land 21, and a chamfer 23 or the like having a pointed end. A recessed sunken groove 4 is formed between the helical teeth 1 and the dog clutch teeth 2 such that the groove 4 is concentric therewith, and tooth roots 24 of the dog clutch teeth 2 stand upright on the bottom surface of the sunken groove 4. Thus, the dog clutch teeth 2 that are arranged concentrically with the helical teeth 1 are disposed at positions deeper than the tooth end faces 14 of the helical teeth 1 in the axial direction. A truncated cone 5 is concentrically disposed inside the dog clutch teeth 2, and a shaft hole 3 extends through the cone 5 in the vertical direction. The helical teeth 1 at the outer periphery, the dog clutch teeth 2 in the inner area, and the cone 5 at the inner periphery are formed coaxially and integrally with each other by hot forging and cold forging.

A process for producing the above-described sunk helical gear will be described with reference to the process chart of FIG. 10. First, in step (1), a workpiece W1 is obtained by cutting a columnar workpiece suitable for producing a gear at a predetermined axial length by, for example, a billet shear. The material of the workpiece may be, for example, carbon steel, chromium steel, chromium molybdenum steel, nickel chromium steel, or nickel chromium molybdenum steel. Next, in step (2), the workpiece W1 is heated to, for example, 1150° C. and subjected to hot forging to form a disc-shaped workpiece W2 having a projection W21 that projects downward. Next, in step (3), a large-diameter portion D1 at the top of the workpiece W2 is subjected to hot forging to form rough helical teeth 10 that are helical with respect to the axial direction. At the same time, a cone 50 is formed in a small-diameter portion D2 at the bottom and a rough sunken groove 40 is concentrically formed between the rough helical teeth 10 at the outer periphery and the cone 50 at the inner periphery. In addition, an inner-diameter portion W31 that is recessed in an arced helicoid shape in cross section is formed in the cone 50, and a flange-shaped flash W32 that projects in the shape of a disc at the outer periphery of the top surface is formed when the rough helical teeth 10 are formed. Thus, a workpiece W3 is obtained. Next, in step (4), the sunken groove 4 that is recessed at the outer periphery of the cone 50 is subjected to finishing by hot forging. At the same time, rough dog clutch teeth 20 whose tooth roots stand on the bottom surface of the sunken groove 4 are formed. Thus, a workpiece W4 is obtained. Next, in step (5), a part of the flash W32 at the top surface of the workpiece W4 and an inner flash in the inner-diameter portion W31 are punched away. Thus, a workpiece W5 having a rough through hole 30 is formed. In step (6), the flash W32 at the top surface of the workpiece W5 is removed by lathe turning. In addition, a normalizing heat treatment, a shot blasting process, and a bonderite process for applying a lubricant are performed. Thus, a workpiece W6 is obtained. Next, in step (7), the rough helical teeth 10 at the outer periphery are subjected to cold ironing and cold coining so that the tooth surfaces thereof are formed into a straight shape and the ridge portions of the tooth end faces are round-chamfered. In addition, the rough dog clutch teeth 20 at the inner periphery are subjected to coining so that the tooth surfaces thereof are formed into a straight shape and the chamfers are formed at the tooth tips. Thus, a workpiece W7 is obtained. Next, in step (8), the rough helical teeth at the outer periphery are subjected to cold forging including cold ironing and cold coining so that the tooth surfaces thereof are crowned and the ridge portions of the tooth end faces are round-chamfered. Thus, the helical teeth 1 are completed. Lastly, in step (9), the rough dog clutch teeth that have been formed into a straight shape in step (7) are subjected to cold forging in which the dog clutch teeth are inversely tapered such that the thickness thereof decreases in the direction from the chamfers toward the tooth roots. Thus, the dog clutch teeth 2 are completed. In the above-described process, steps (2), (3), (4), and (5) are hot forging, and steps (7), (8), and (9) are cold forging including cold ironing and cold coining. The details of steps (3) and (4) for forming the tooth profile by hot forging will be described in more detail with reference to FIG. 11.

Step (3) for forming the tooth profile will now be described in detail with reference to FIG. 11. In this step, hot forging is performed to form the tooth profile having a free-form surface. Hot forging is a forging method for forming a gear having a desired tooth profile by enclosing a workpiece in a space in a closed die and pushing a punch into the workpiece. A method for forming a sunk helical gear will be described in detail. In step (3), the workpiece W2 is set in a die and is subjected to hot forging to form the helical teeth. An upper punch P1 and a mandrel P2 that independently moves up and down inside the upper punch P1 is shown in the right half of part (a) of FIG. 11, and the workpiece W2 is shown in the right half of part (b) of FIG. 11. A die piece Q1 and a die piece Q2 disposed inside the die piece Q1 are shown in the right half of part (c) of FIG. 11. The top surface QT of the die piece Q1 has a stepped shape and projects upward. When the upper punch P1 is moved downward to crush the workpiece W2, the workpiece W2 is enclosed by the die piece Q1 and the upper punch P1. The upper punch P1 and the mandrel P2 are positioned directly above the depressed die pieces Q1 and Q2. The die piece Q1 has a tooth die portion T1 for forming the helical teeth in an upper section thereof. The workpiece W2 is placed on the set of die pieces Q1 and Q2, and the upper punch P1 is moved downward from above to crush the workpiece W2. At this time, the large-diameter portion D1 of the workpiece W2 is pushed into the tooth die portion T1 for forming the helical teeth, so that the rough helical teeth 10 are formed. The tooth die portion T1 has a free-form surface, so that the free-form surface is transferred onto the workpiece W2 and the rough helical teeth 10 are formed accordingly. In other words, the free-form surface is formed on the rough helical teeth 10 by hot forging. In step (3), the rough sunken groove 40 is concentrically formed inside the rough helical teeth 10 in a recessed state. Thus, the workpiece W3 is formed. In the next step (4), the rough dog clutch teeth 20 are formed, and the rough sunken groove 40 is formed in the workpiece W4 in a recessed state such that the rough sunken groove 40 is concentrically disposed between the rough helical teeth 10 at the outer periphery and the rough dog clutch teeth 20 at the inner periphery.

If the rough helical teeth 10 have a straight shape, the workpiece can be pulled out of the die piece Q1. However, since helical portions of the rough helical teeth 10 require rotation relative to the die piece Q1, the workpiece cannot be removed by pulling the workpiece straight upward. Accordingly, an ejector P5 is provided below the die piece Q1 and the die piece Q2 disposed inside the die piece Q1 such that the ejector P5 is capable of projecting and retracting. A helical guide T3 having the same lead as that of the helical tooth die portion T1 is formed on the outer surface of the ejector P5. In the present embodiment, the ejector P5 is caused to move upward from below the die piece Q1 while rotating in a screwing motion, thereby forcibly rotating the formed rough helical teeth 10. Thus, the workpiece can be efficiently removed. Thus, in step (3) for forming the rough helical teeth 10, the desired free-form surface may be formed on the helical teeth by hot forging. Then, in step (8), which is performed afterwards, the rough helical teeth 10 at the outer periphery are subjected to cold forging including cold sizing and cold coining to finish the tooth profile having the free-form surface.

The free-form surface gears according to the present disclosure are not limited to application in transmissions for vehicles, and may be used in gear pumps, clocks, or various power transmission mechanisms in, for example, construction machines and industrial machines.

While embodiments of the present disclosure have been particularly shown and described with reference to exemplary embodiments thereof, it will be understood by those of ordinary skill in the art that various changes in form and details may be made therein without departing from the spirit and scope of the present disclosure as defined by the following claims.

What is claimed is:

1. A transmission gear having a tooth surface and a tooth bottom land, said transmission gear comprising:
    the tooth surface and the tooth bottom land having different free form surfaces;
    the free form surface of the tooth surface is formed of a first curved surface having a plurality of a radius of curvatures;
    the free form surface of the tooth bottom land is formed of a second curved surface having a radius of curvature;
    the first curved surface of the tooth surface has an area around a mating pitch point, wherein the smallest radius of curvature among a plurality of radii of curvatures in the area around the mating pitch point is maximized;
    the second curved surface of the tooth bottom land has a tooth root connecting to the tooth surface, wherein the radius of curvature around the tooth root is maximized; and
    wherein the first curved surface is formed of a compound surface of three different types of surfaces selected from one of the sets of: (a) a group of a cycloid helicoid surface, a trochoid helicoid surface, a circular helicoid surface, a limacon helicoid surface, a three-dimensional coordinate surface, an epitrochoid helicoid surface, a petritrochoid helicoid surface, and an involute helicoid surface; and (b) a group of a cycloid surface, a trochoid surface, an epitrochoid surface, a peritrochoid surface, a circular surface, a limacon surface, and an involute surface; and
    wherein the second curved surface is formed of a circular surface.

2. The transmission gear according to claim 1, wherein the first curved surface is formed a spur gear or a helical gear.

3. The transmission gear according to claim 1, wherein the first curved surface is formed of a compound surface of three type of surfaces selected from said set (a) of a group of a cycloid helicoid surface, a trochoid helicoid surface, a circular helicoid surface, a limacon helicoid surface, a three-dimensional coordinate surface, an epitrochoid helicoid surface, a peritrochoid helicoid surface, and an involute helicoid surface.

4. The transmission gear according to claim 1, wherein the first curved surface is formed of a compound surface of three type of surfaces selected from said set (b) of a group of the cycloid surface, a trochoid surface, an epitrochoid surface, a peritrochoid surface, a circular surface, a limacon surface, and an involute surface.

5. The transmission gear according to claim 1, wherein the transmission gear is formed by hot and cold forging.

6. The transmission gear according to claim 1, wherein the compound surface of three types of surfaces consists of said pitch-point area surface that surrounds a pitch point, an addendum surface that extends from an edge of a top land to the top of the pitch-point area surface, and a dedendum surface that extends from an edge of the tooth bottom land to the bottom of the pitch-point area surface, each of said addendum surface, said dedendum surface and said pitch-point area surfaces being different types of surfaces from one another.

7. The transmission gear according to claim 6, wherein said pitch-point area surface is a cycloid surface.

8. The transmission gear according to claim 7, wherein one of said addendum surface and said dedendum surface is one of a trochoid surface or an epitrochoid surface and the other of said addendum surface and said dedendum surface is the other of a trochoid surface or an epitrochoid surface.

9. The transmission gear according to claim 7, wherein said addendum surface is a trochoid surface, an epitrochoid surface or an involute surface and said dedendum surface is a trochoid surface or an epitrochoid surface.

* * * * *